B. SLUSSER.
Earth-Scraper.
No. 201,057.     Patented March 5, 1878.
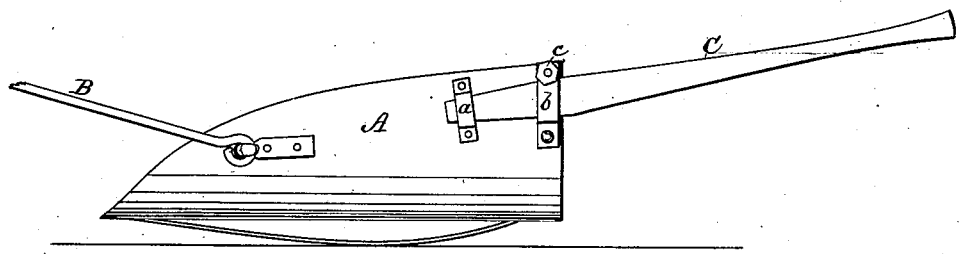
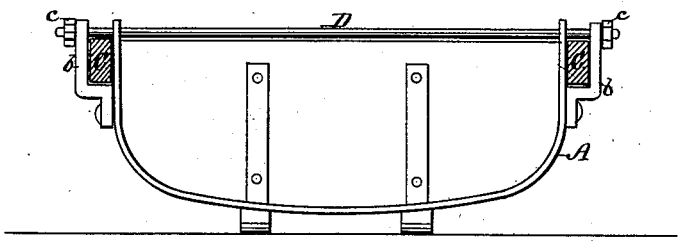
WITNESSES:
W. W. Hollingworth
Solon C. Kemon
INVENTOR:
Benj. Slusser
BY
ATTORNEYS.
N. PETERS, PHOTO-LITHOGRAPHER, WASHINGTON, D. C.

UNITED STATES PATENT OFFICE.

BENJAMIN SLUSSER, OF SIDNEY, OHIO, ASSIGNOR TO HIMSELF AND WILLIAM H. C. GOODE, OF SAME PLACE.

IMPROVEMENT IN EARTH-SCRAPERS.

Specification forming part of Letters Patent No. 201,057, dated March 5, 1878; application filed November 20, 1877.

*To all whom it may concern:*

Be it known that I, BENJAMIN SLUSSER, of Sidney, in the county of Shelby and State of Ohio, have invented a new and Improved Earth-Scraper; and I do hereby declare that the following is a full, clear, and exact description of the same, reference being had to the accompanying drawing, forming part of this specification, in which—

Figure 1 is a side elevation. Fig. 2 is a rear-end view, with the handles in section.

The object of my invention is to provide an improved means of attaching the handles to an earth-scraper.

The improvement consists in arranging the forward end of the handle in a socket attached to the scraper, and fastening the handle by a clamp which secures the same by being attached to the extended ends of the same tie-rod which holds together the sides of the scraper, as hereinafter more fully described.

In the drawing, A represents the scraper; B, the bail, and C the handles, secured in accordance with my invention. Said handles are straight wooden or metallic bars, inserted at their front ends into sockets *a*, riveted to the sides of the scraper, and held at the rear edge of the scraper by clamps *b*, which are riveted upon one side of the handle to the scraper, and tightened and secured at the top by the tie-rod D, which holds the sides of the scraper against the wooden back, the said tie-rod being extended through a perforation in the sides of the scraper and the clamp, and secured upon the outside of the latter by a nut, *c*.

This, it will be seen, forms a strong, durable, and economical means for attaching the handles, and, while permitting the ready removal of the same, also allows the handles to be tightened from time to time, as the wear may render necessary.

I am aware that it is not new to extend the tie-rod which holds the back and sides of the scraper through a perforation in the handles, for the purpose of securing them also, said idea being shown in the expired patent to Blakeslee, of April 7, 1857. This arrangement, however, will not allow the removal of the handles nor the tightening of the same without first removing the tie-rod, as the extension of the tie-rod through the perforation in said handles prevents the latter from being moved longitudinally when the tie-rod is in place. The clamp in my invention, however, fastened upon one side to the scraper, and closed in about the handles on the other by the tie-rod, holds the handles securely, and yet allows the handles to be driven up longitudinally and clamped tightly when worn, or be entirely removed without removing the tie-rod from its place.

Having thus described my invention, what I claim as new is—

The clamp *b*, bolted to the scraper upon one side of the handle, and combined with the tie-rod D, extended through the side of the scraper, and connected with the free end of the clamp, to close in the handle and secure it in place, substantially as described.

BENJAMIN SLUSSER.

Witnesses:
A. BRADFORD,
BENJ. F. MARTIN.